United States Patent [19]
Cohen et al.

[11] Patent Number: 5,887,027
[45] Date of Patent: Mar. 23, 1999

[54] METHOD OF UPSTREAM CHANNEL MODELING FOR PCM MODEM

[75] Inventors: Herbert B. Cohen, Morganville; Mingjie Wang, Eatontown, both of N.J.

[73] Assignee: Lucent Technologies Inc., Murray Hill, N.J.

[21] Appl. No.: 998,249

[22] Filed: Dec. 24, 1997

[51] Int. Cl.$^6$ .................................................. H04B 1/38
[52] U.S. Cl. ........................................ 375/222; 375/242
[58] Field of Search ...................................... 375/222, 242, 375/216, 232, 296; 379/93.01, 93.08; 455/296, 69

[56] References Cited

U.S. PATENT DOCUMENTS 5,005,168  4/1991  Cummiskey et al. ................... 375/222

Primary Examiner—Temesghen Ghebretinsae

[57] ABSTRACT

A method is presented to enable high speed transmission in the upstream channel from a customer's modem to a PCM modem connected to the public switched digital network. The upstream channel is equalized by having the client modem send a known training sequence in the upstream direction to the server modem. The server modem calculates the cross-correlation between the known training sequence and the sequence as actually received from the client modem. The cross-correlation is then multiplied by the known auto-correlation of the training sequence to produce a model of the channel response. The channel response is then reported to the client modem so that it may adjust its pre-equalizer to construct the signal that the client modem will thereafter send in the upstream direction.

5 Claims, 2 Drawing Sheets

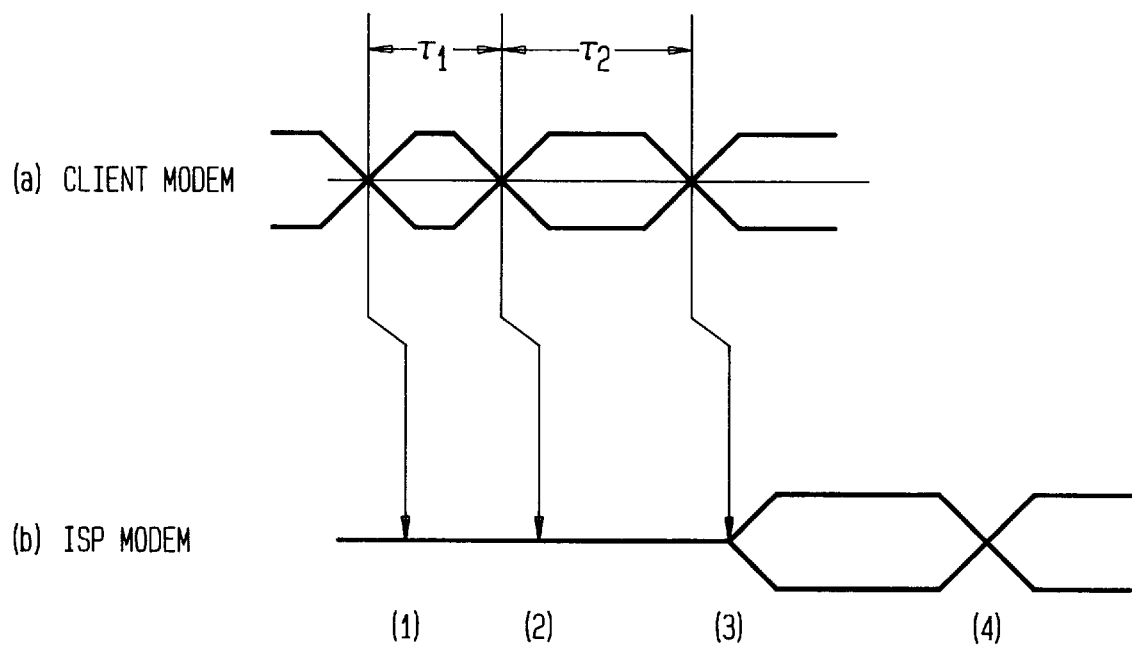

METHOD OF UPSTREAM CHANNEL MODELING FOR PCM MODEM

FIELD OF THE INVENTION

This invention relates to digital transmission between a client modem and a network server modem and, more particularly, to bidirectional transmission in the presence of non-linear noise.

BACKGROUND OF THE INVENTION

In the usual connection between two subscriber's modems using the telephone network, the subscriber's digital data must be translated into analog tones for transmission over the local loop to and from the telephone network. At each subscriber's modem, the received analog waveform is sampled and quantized by a high precision analog to digital (A/D) converter and at a sufficiently high sampling rate to avoid aliasing distortion. For the symbols transmitted over the channel to be reasonably free of intersymbol interference over the frequency spectrum used by the symbols, the modems employ adaptive filters called equalizers. When the channel is properly equalized, symbols preceding and following the symbol of interest contribute nothing to that signal, i.e., there is no inter-symbol interference at the moment when the signal of interest is sampled. The channel response that needs to be equalized includes the loop resistance, the anti-aliasing filter, the hybrid circuit, and any analog and digital filters that may be present in the signal transmission/receiving path. Equalization is accomplished by passing the digital signal through an adaptive filter whose tap coefficients are adjusted in a direction opposite to the derivative of the mean square error signal for that tap. This method is also referred to as the least mean squared (LMS) method of adaptation and is well understood in such textbook literature as Bernard Widrow's "Adaptive Signal Processing".

However the public switched telephone network is not quite transparent to the transmitted symbols because a limited precision A/D converter is employed at the network interface to the local loop so that the digital signal presented to the adaptive filter includes whatever error was introduced because of the difference between the network codec's limited set of discrete slicing levels and the actual amplitude of the received analog signal. The amplitude difference to the nearest quantization level is called the quantization error. This error in $\mu$-law and A-law pulse-coded modulation (PCM) codecs is different for each amplitude of transmitted signal. As a result, the response that needs to be equalized includes the quantization error characteristics of the network A/D converter, as well as that of the physical channel, e.g., the subscriber loop. While the response of the subscriber loop can be reasonably well modeled with a linear response over the voice band, important non-linear impairments are present in the A/D and D/A converters. It has been observed that A-law or $\mu$-law PCM encoding introduces about 37–38 dB of quantization noise. This quantization noise sets an upper limit to the transmission speeds obtainable using traditional modem modulation techniques, such as CCITT V.34. U.S. Pat. No. 5,394,437 describes a high speed client modem which minimizes the effects of quantization noise by having its sampling times synchronized with, and its slicing levels the same as, those of the network PCM codec.

With the rapid proliferation of Internet communications, an even higher speed of operation is achievable for connections through the public switched telephone network between an Internet service provider's server modem and a subscriber's modem. Because most Internet service providers (ISPs) connect to the public switched telephone network using a digital line, such as T-1, data coming from an ISP need undergo no analog-to-digital conversion and therefore remains free of quantization noise. At the user's side interface to the subscriber's loop, a linear codec which has an SNR of 80–90 dB performs analog-to-digital conversion and the analog signal reaching the subscriber's modem is equalized in the usual manner. The result—in theory, at least—is throughput as high as 56 kbps in the "downstream" direction from the ISP to the client modem. Such higher speed operation is not, however, achievable in the "upstream" direction from the customer's modem to the server modem because the network $\mu$-law or A-law PCM codec limits the SNR of the received signal to 37–38 dB and therefore the achievable speed.

SUMMARY OF THE INVENTION

In accordance with the principles of the present invention, in an illustrative embodiment thereof, equalization of the upstream channel from a customer's modem to a PCM modem enables transmission to be conducted at higher speeds in the upstream direction in the presence of non-linear noise. The upstream channel, which is the total response from the client modem's D/A codec to the network codec's A/D point, is equalized by having the client modem send a known training sequence in the upstream direction to the server modem. The server modem calculates the cross-correlation between the known training sequence and the sequence as actually received from the client modem. The cross-correlation is then multiplied by the known auto-correlation of the training sequence to produce a model of the channel response. The channel response is then reported to the client modem so that it may adjust its pre-equalizer to construct the signal that the client modem will thereafter send in the upstream direction. The pre-equalized signal will be free from inter-symbol interference and its signal level will be close to the quantization levels of the network codec at its sampling moment, resulting in a SNR higher than 37–38 dB, and therefore higher speed is achievable.

BRIEF DESCRIPTION OF THE DRAWING

The foregoing and other objects of this invention are attained in the illustrative embodiment in which:

FIG. 2 shows illustrative timing of the processes carried out at the client and server modems.

GENERAL DESCRIPTION

Figure 1:
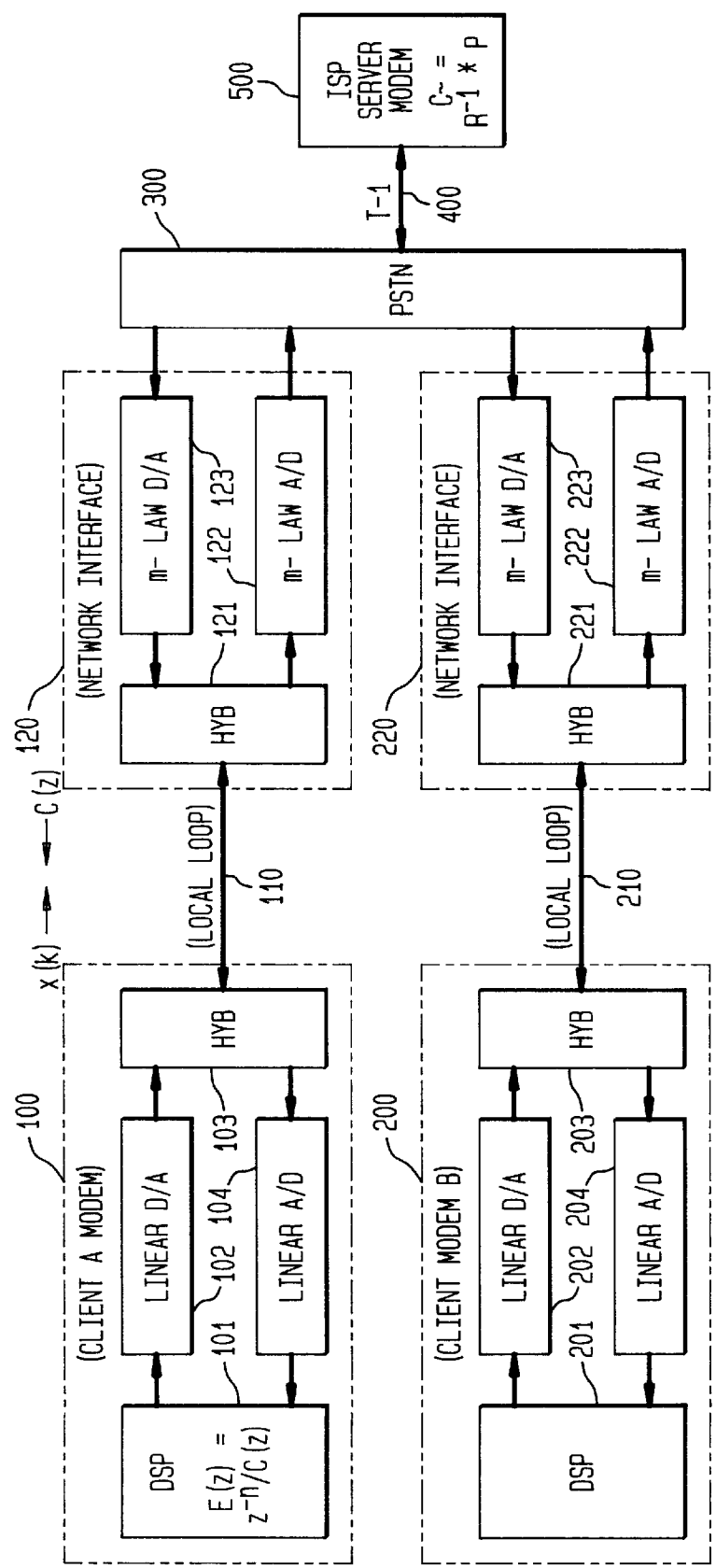
FIG. 1 shows the upstream and downstream channels between subscriber modems and a PCM server modem connected through a digital switching network.

Referring now to FIG. 1, there is shown, at the left, a client A modem 100 and a client B modem 200. Each modem contains a digital signal processor DSP, a linear digital-to-analog converter D/A for upstream transmission, a linear analog-to-digital converter A/D for downstream reception and a hybrid HYB which permits bidirectional transmission over its respective local loop 110, 210. At the other end of each local loop, a respective network interface 120, 220 contains a corresponding hybrid and a codec for conversion of the analog signals to $\mu$-law or A-law PCM, and vice versa. The PCM signals are digitally switched through the public switched digital network 300.

On a connection through the public switched telephone network 300 between client A modem 100 and client B modem 200, the respective digital signal processor DSP performs equalization on the downstream digital signals received from its respective linear A/D, typically using an LMS algorithm. More particularly, DSP 101 performs equalization of downstream signals received by linear A/D 104 that were transmitted from client modem B while DSP 201 performs equalization of downstream signals received by linear A/D 204 that were transmitted from client modem A. The channel from client modem B to client modem A may be traced beginning at D/A 202 through hybrid 203 to local loop 210 to network interface 220 (including hybrid 221 and µ-law A/D 222) to PSTN 300 and then to network interface 120 (including µ-law D/A 123 and hybrid 121), to local loop 110, hybrid 103 and linear A/D 104 to DSP 101. The channel from client modem A to client modem B may be traced beginning with linear D/A 102 through hybrid 103 to local loop 110 to network interface 120 (including hybrid 121 and µ-law A/D 122), to PSTN 300 and then to network interface 220 (including µ-law D/A 223 and hybrid 221), to local loop 210, hybrid 203 and linear A/D 204 to DSP 201. Accordingly, the respective channels between client A modem 100 and client B modem 200 are each equalized.

On a connection from ISP modem 500 through PSTN 300 to either client A modem 100 or client B modem 200, the respective digital signal processor 101, 201 performs a similar equalization on (downstream) signals received over its respective local loop 110, 210 from PSTN 300. However, on signals sent upstream from client modem A or client modem B to ISP server modem 500, equalization performed by modem 500 using the LMS algorithm converges very slowly to the channel response and the estimation of the channel is not accurate enough due to the non-linear nature of the µ-law or A-law codec.

In accordance with an important aspect of this invention, this shortcoming of the prior art is rectified. Incident to the establishment of a connection between a client modem, such as client A modem 100 and ISP server modem 500, the client modem as shown in FIG. 2(*a*) sends a particular tone, such as 1800 Hz, with its phase reversed at moment (1). It continues to send the phase reversed tone for a predetermined fixed interval $\tau_2$, such as 10 ms after moment (1). At the end of $\tau_1$, client modem 100 during interval $\tau_2$, FIG. 2(*b*) at (2) to (3), sends a pre-arranged training sequence x(k) to ISP server modem 500. ISP server modem 500 receives sequence y(k) which is a modified form of the training sequence as distorted by passage over the channel. However, instead of employing the sort of LMS algorithm typically used in the client modems, ISP modem 500 preferably employs a different technique. This is because when an LMS algorithm is used to model channel response C(z), a digital receiving filter Q(z) must be employed to reject out-of-band noise (such as nonlinear distortions caused by the network's µ-law codec and harmonics of the power mains, e.g., 60 Hz), before channel modeling can be performed so that the LMS algorithm will converge to C(z) within a reasonable time. However, when such a filter is used, channel modeling contains the effects of the channel C(z) combined with the filter Q(z), instead of C(z). In other words, the estimated response is Q(z)*C(z), not the stand-alone C(z) that is needed.

The solution provided by an aspect of this invention is to model C(z) in the presence of the above noise by directly calculating the optimum estimation C~(z) in the minimum MSE sense. Modem 500 computes:

$$\sim C = R^{-1} * P \qquad (1)$$

i.e., the convolution of $R^{-1}$ and P, where R is the auto-correlation matrix of input signal x(k) and P is the calculated cross-correlation vector between x(k) and y(k). It is to be appreciated that $R^{-1}$ is a fixed matrix which need be calculated only once when the pre-arranged training sequence is designed and thereafter need merely be used by ISP modem 500 when channel modeling is performed in response to the reception of the training sequence. The only calculations required to be performed at modem 500 in response to the training sequence is the vector P and the matrix product of $R^{-1}$ and P.

Having computed equation (1), modem 500, as shown in FIG. 2(*b*) at (3), communicates the results, C(z) to the attached client modem 100 or 200 whose respective DSP then creates the corresponding pre-equalizer $E(z)=z^{-n}/C(z)$ for shaping of the subsequent message symbols to be transmitted upstream to modem 500. The factor $z^{-n}$ denotes a delay of n samples in the pre-equalizer's input signal. Since 1/C(z) could be a non-causal filter, this delay of n is introduced so that E(z) will be a causal filter and thus physically realizable.

What has been described is deemed to be illustrative of the principles of the invention. Numerous modifications may be made by those skilled in the art without, however, departing from the spirit and scope of the invention.

What is claimed is:

1. A method of equalizing an upstream channel from a client modem to a PCM modem connected to a digital switching network, comprising:
    a. transmitting a pre-arranged training sequence x(k) from the client modem to the PCM modem;
    b. computing at the PCM modem an estimate of an upstream channel response C~(z) from the convolution of the inverse auto-correlation matrix of the training sequence with a calculated cross-correlation vector between the training sequence x(k) and the sequence actually received y(k) by the PCM modem;
    c. transmitting the estimate obtained in step (b) to the client modem; and
    d. adjusting the shaping of symbols thereafter transmitted by the client modem in the upstream direction in accordance with said estimate.

2. A method of pre-equalizing an upstream leg of a client modem in a channel which includes a PCM modem connected to a digital switching telephone network, comprising:
    a. causing said modem to transmit a pre-arranged training sequence x(k) to the PCM modem;
    b. computing an estimate of an upstream channel response C~(z) from the convolution of the inverse auto-correlation matrix of the training sequence with a calculated cross-correlation vector between the training sequence x(k) and the sequence actually received y(k) by the PCM modem;
    c. receiving at the client modem the estimate obtained in step (b); and
    d. adjusting the shaping of symbols thereafter transmitted by the client modem in the upstream direction in accordance with said estimate.

3. A method of operating a PCM modem connected to a digital switching network comprising:
    a. receiving over said network a training data sequence y(k) at said PCM modem;
    b. convolving the inverse auto-correlation matrix (R-1) of a pre-arranged version x(k) of said training sequence with a calculated cross-correlation vector between said training sequence x(k) and the sequence actually received y(k) at said PCM modem to derive an estimate of an upstream channel to said modem through said digital network; and c. transmitting said estimate downstream through said network to the source of said training data sequence.

4. In a client modem for use with a channel extending to a PCM modem through a digital switch, the combination comprising:

a. means for causing said modem to transmit a pre-arranged training sequence x(k) to the PCM modem;

b. means for receiving from said PCM modem an estimate of an upstream channel response C~(z); and c. means for adjusting the shaping of symbols thereafter transmitted by said client modem in the upstream direction in accordance with said estimate.

5. In a PCM modem for use with a channel extending to a client modem through a digital switch, the combination comprising:

a. means for receiving over said channel from said client modem a training data sequence y(k);

b. means for convolving the inverse auto-correlation matrix (R-1) of a pre-arranged version x(k) of said training sequence with a calculated cross-correlation vector between said training sequence x(k) and the sequence actually received y(k) at said PCM modem to derive an estimate of the upstream channel to said modem through said digital switch; and c. means for transmitting said estimate downstream through said switch to said client modem.

\* \* \* \* \*